No. 756,363. PATENTED APR. 5, 1904.
J. G. HELFERS.
SPEED GOVERNOR.
APPLICATION FILED MAY 18, 1903.
NO MODEL. 2 SHEETS—SHEET 1.

WITNESSES:
H. Stahlgren.
B. Patterson.

INVENTOR
J. G. Helfers
BY
Clary Demest Co
ATTORNEYS

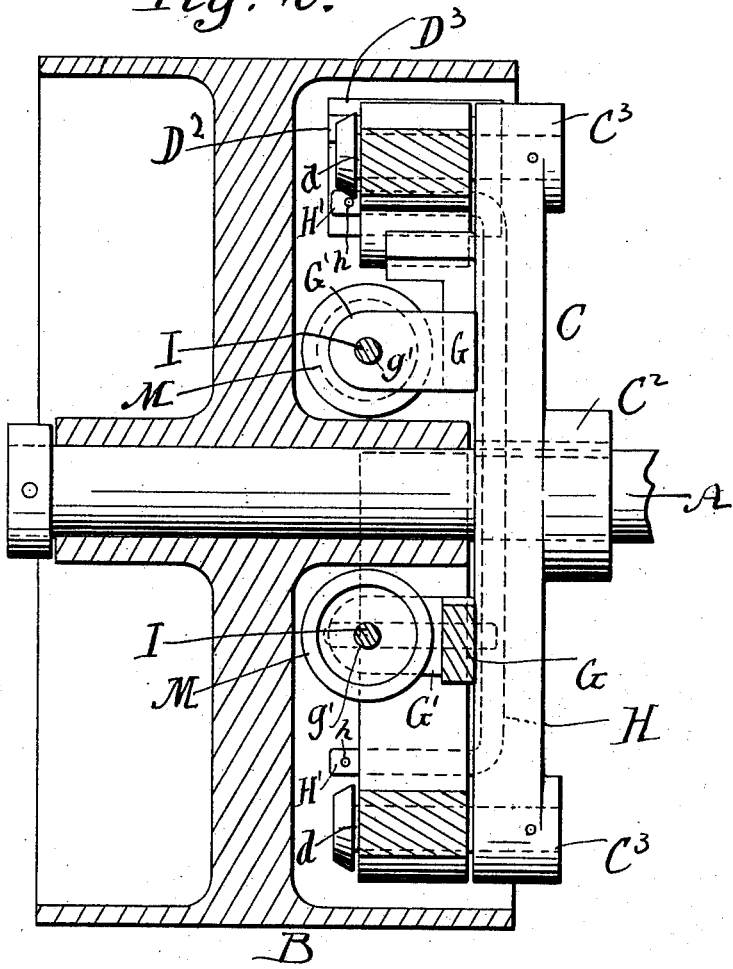

No. 756,363. Patented April 5, 1904.

UNITED STATES PATENT OFFICE.

JOHN GEORGE HELFERS, OF DONNELLSON, ILLINOIS.

SPEED-GOVERNOR.

SPECIFICATION forming part of Letters Patent No. 756,363, dated April 5, 1904.

Application filed May 18, 1903. Serial No. 157,512. (No model.)

*To all whom it may concern:*

Be it known that I, JOHN GEORGE HELFERS, a citizen of the United States, and a resident of Donnellson, county of Montgomery, and State of Illinois, have invented certain new and useful Improvements in Speed-Governors, of which the following is a specification, reference being had to the accompanying drawings, forming a part thereof, in which similar letters of reference indicate corresponding parts.

This invention relates to improvements in speed-governors, particularly that kind of governors in which frictional contact is used as a means for governing the speed of moving mechanism, and especially to the class of governors used for controlling the speed of the fans of grain-separators.

It has been found in practice that as long as the fan of a grain-separator runs at normal speed it does not waste the grain, but that as soon as the fan begins to exceed normal speed it begins to throw out and waste the grain.

The object of this invention is to obviate that difficulty.

The object of the invention is also to provide novel mechanism whereby when such fan has attained a predetermined rate of speed it is disconnected from the power, and so prevented from attaining any greater speed.

The invention also has divers other objects, which will be fully hereinafter set forth.

The nature of the invention will be fully understood from the following general description and the annexed drawings and will be subsequently pointed out in the claims.

Figure 1:
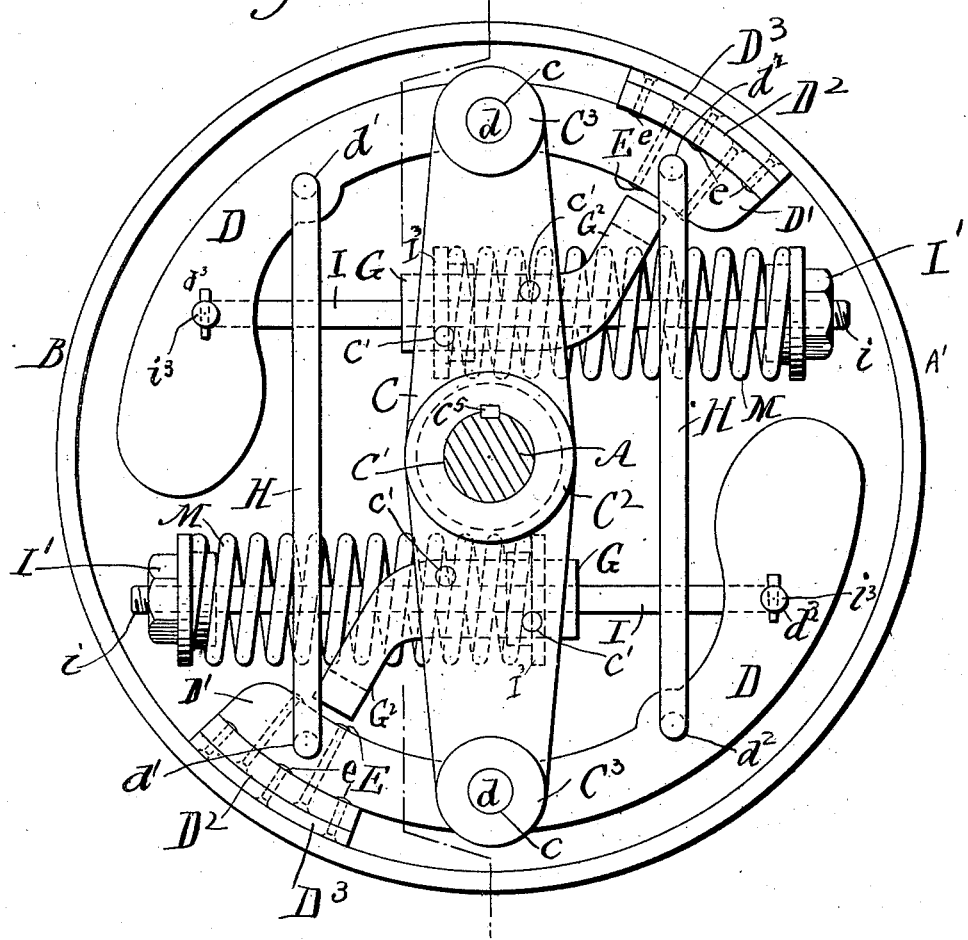
Figure 3:
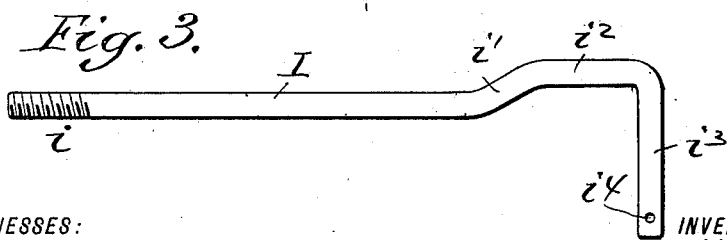

In the accompanying drawings, which are hereby made a part of this specification, Figure 1 is a face view of my newly-invented fan-governor, showing the edge of the pulley to which it is applied. Fig. 2 is a sectional view of the same, taken on the line $x\ x$ of Fig. 1. Fig. 3 is a detail view of part of my invention, which will be hereinafter particularly described.

A designates the main shaft of the fan, and B the driving-pulley, which is loosely mounted on said shaft.

C designates a beam which is mounted on the shaft A. This beam has three hubs—a middle hub $C^2$ and two end hubs $C^3$. In these hubs are bored the holes $C'$ $c$ $c$. The hole $C'$ fits on the shaft A, and the beam is rigidly secured thereon by the key $c^5$, which is driven into suitable key-seats in the beam and the shaft. This beam is also pierced with rivet-holes $c'$.

D D' designate the shoe-levers. There are two of these. They are curved, as represented, and pivoted by the pins $d$ in the hubs $C^3$ of the beam C, within the rim of the pulley B, with their convex edges toward the concave surface of the pulley-rim. $D^2$ designates friction-shoes fastened on the ends of the levers D D'. These may be secured by rivets or in any other available way. In the example of my invention here given I have illustrated them as secured by rivets E. $D^3$ designates facings, which may be of leather or of any other suitable material. In the illustration here given these are represented as being fastened by a plurality of rivets $e\ e\ e$. These facings are arranged to engage the inner surface of the rim of the pulley B.

G designates brackets made of pieces of flat metal thinner at the end $G^2$, bent edgewise and sidewise at the ends, as illustrated. They are pierced with rivet-holes, which register the holes $c'$ in the beam C and by which they are riveted to said beam in the positions illustrated in Fig. 1.

H designates rods which may be of convenient length and thickness. They are bent with right-angular extensions H' and pierced with holes $h$. There are two of these, which, passing with their right-angular extensions through the holes $d'$ and $d^2$ of the levers D D', pivotally connect the said levers together. Key-pins passing through the holes $h$ secure them in proper positions, as illustrated in Fig. 2.

I designates rods which may be of any suitable size and thickness. They are bent as illustrated at $i'$, $i^2$, and $i^3$, pierced with holes at $i^4$, and cut with screw-threads at $i$. On these threads work the nuts I'. The bodies of these rods pass loosely through the holes $g'$ of the brackets G. Their right-angular extensions $i^3$ engage the holes $d^3$ in the levers D D' and are held in position by key-pins passing through the holes $i^4$ in their said right-angular extensions $i^3$. The positions of these rods are illustrated in Fig. 1.

M designates helical springs which, surrounding the rods I, are interposed between the extensions G' of the brackets G and the nuts I'. Washers $I^3$ limit the motion of the rods I in said bracket.

When the various parts of my invention are assembled as hereinbefore set forth, it will be found that the frictional contact of the shoes $D^2$ with the pulley-rim will cause the pulley to carry the shaft A as long as the speed is limited to a predetermined rate, to which the mechanism may be adjusted by turning the nuts I'; but as soon as a greater speed is attained than the predetermined rate the centrifugal force causing the ends D of the levers D D' to move outward will withdraw the ends D' and the accompanying friction mechanism from the rim of the pulley. The pulley B will then cease to drive the shaft A, which, being free, will gradually subside to its normal rate of speed. The parts of the mechanism will then assume their normal positions, the friction-shoe engage the pulley-rim, and the pulley again actuate the shaft. The levers D D', being connected by the rods H, together with them form a link connection, so that when one lever moves the other makes a like motion, both acting in concert. The washers $I^3$ limit the motion of the rods I, so that they can cause the levers D D' and their friction-shoes to exert only so much frictional resistance on the wheel; but by turning the nuts I' the limit of speed may be increased or diminished in accordance with the tension of the springs.

It is evident that this speed-governor is not only applicable to the fans of grain-separators, but also to divers other kinds of machinery, in all of which it would work equally well without any or but little change.

Having now described and ascertained what my invention is and how the same is constructed, made, and used, what I claim as my invention, and desire to secure by Letters Patent, is—

1. The combination with a revoluble shaft, and a pulley loosely and revolubly mounted on said shaft, of a transverse bar rigidly fastened by its middle on said shaft within the rim of said pulley, levers pivoted on the ends of said bar within the rim of the said pulley, friction-shoes carried by said levers and normally engaging the inner surface of the rim of said pulley, rods mounted within said pulley-rim, and engaging said levers, springs on said rods and by their resilience normally holding said shoes in contact with said rim, and means together with which said mechanism is enabled to actuate said shaft and also to sever the operative connection between said shaft and said pulley when a predetermined rate of speed has been attained.

2. The combination with a revoluble shaft, and a pulley loosely and revolubly mounted thereon, of a transverse bar rigidly fastened by its middle on said shaft within the rim of said pulley, levers pivoted on the ends of said bar, friction-shoes carried by said levers and working on the inside surface of said pulley-rim, brackets having right-angular extensions, also fastened on said bar, rods engaging said levers and passing through said extensions, springs on said rods, and by their resilience, normally holding said shoes in engagement with said pulley-rim, to actuate said shaft, and said mechanism also arranged so that when a predetermined rate of speed has been attained the operative connection between said shoes and said rim will be severed.

3. The combination with a revoluble shaft, and a pulley loosely and revolubly mounted thereon, of a transverse bar rigidly fastened on said shaft, within the rim of said pulley, levers pivoted on the ends of said bar, friction-shoes carried by said levers, and working on the inside of the rim of said pulley, brackets having right-angle extensions rigidly fastened on said bar, rods engaging said levers and passing through said extensions, nuts on the free ends of said rods, springs on said rods between said nuts and said extensions of said brackets, and by their resilience normally holding said shoes in contact with said pulley-rim, and driving said shaft and so arranged that when a predetermined rate of speed has been attained, the operative connection between said shaft and said pulley will be severed.

4. The combination with a revoluble shaft, and a pulley loosely and revolubly mounted thereon, of a transverse bar rigidly fastened by its middle upon said shaft within the rim of said pulley, levers pivoted upon the ends of said bar, friction-shoes carried by said levers and working on the inside surface of the rim of said pulley, brackets having right-angle extensions rigidly fastened on said bar, rods engaging said levers and passing through said extensions, nuts on the free ends of said rods, springs on said rods between said nuts and said extensions, and washers on said rods limiting their motion, and all said mechanism arranged so that said springs will by their resilience normally hold said shoes in engagement with said pulley-rim, enable said pulley to actuate said shaft, and at the same time so arranged as to sever the operative connection between said shoes and said rim when a predetermined rate of speed has been attained.

5. The combination with a revoluble shaft, and a pulley loosely and revolubly mounted thereon, of a transverse bar rigidly fastened by its middle on said shaft within the rim of said pulley, levers pivoted on the ends of said bar, so that the distance from the pivot to one end will be shorter than the distance to the other end, friction-shoes carried by the short ends of said levers, and working on the inside surface of the rim of said wheel, brackets having right-angular extensions fastened on said bar, rods engaging said levers and passing through said extensions, nuts on the free ends of said rods, springs on said rods between said nuts and said extensions and washers on said rods limiting their motion, and all said mechanism arranged so that by means of the said nuts the springs may be adjusted to such tension that the said shoes will be held normally in contact with said rim, but only enable the said pulley by their engagement to drive the said shaft until it has attained a predetermined rate of speed, and that when said shaft exceeds such speed, the centrifugal force acting on the longer ends of said levers will draw the shoes away from said rim, and so sever the connection between said pulley and shaft, and allow the shaft to resume normal speed and the mechanism to assume normal position.

6. The combination with a revoluble shaft and a pulley loosely and revolubly mounted thereon, of a transverse bar rigidly mounted on said shaft, levers pivoted on said shaft, friction-shoes carried by said levers and working on the inside surface of the rim of said pulley, brackets having right-angle extensions rigidly fastened to said bar, rods engaging said levers and passing through said extensions, springs on said rods, and nuts and washers on said rod, and connecting-rods having right-angular extensions at each end extending between said levers, and pivotally engaging said levers with such extensions; so that said levers move together through the same angle, when turned on their pivotal connection with the said bar and all said mechanism so arranged that said pulley actuates said shaft and also that when a predetermined rate of speed has been attained, the operative connection between said shaft and said pulley will be severed.

In testimony that I claim the foregoing as my invention I have signed my name, in presence of two witnesses, this 24th day of January, A. D. 1903.

JOHN GEORGE HELFERS.

Witnesses:
   WM. D. BOONE,
   H. B. MCCASLIN.